US011967235B2

(12) United States Patent
Teuss et al.

(10) Patent No.: US 11,967,235 B2
(45) Date of Patent: Apr. 23, 2024

(54) METHOD FOR DETERMINING THE POSITION OF A NON-MOTORIZED ROAD USER AND TRAFFIC DEVICE

(71) Applicant: AUDI AG, Ingolstadt (DE)

(72) Inventors: Andrejs Teuss, Freising (DE); Johannes Wallner, Garching (DE); Sebastian Engel, Ingolstadt (DE); Jürgen Richter, Ingolstadt (DE); David Pankalla, Neuburg a. d. Donau (DE); Johannes Wittmann, Weißenburg (DE)

(73) Assignee: AUDI AG, Ingolstadt (DE)

( * ) Notice: Subject to any disclaimer, the term of this patent is extended or adjusted under 35 U.S.C. 154(b) by 239 days.

(21) Appl. No.: 17/061,883

(22) Filed: Oct. 2, 2020

(65) Prior Publication Data

US 2021/0118304 A1 Apr. 22, 2021

(30) Foreign Application Priority Data

Oct. 16, 2019 (DE) .................... 10 2019 127 930.5

(51) Int. Cl.
*G08G 1/16* (2006.01)
*G08G 1/01* (2006.01)
*H04W 4/44* (2018.01)

(52) U.S. Cl.
CPC ............ *G08G 1/166* (2013.01); *G08G 1/012* (2013.01); *G08G 1/0133* (2013.01); *G08G 1/161* (2013.01); *H04W 4/44* (2018.02)

(58) Field of Classification Search
CPC ...... G08G 1/166; G08G 1/012; G08G 1/0133; G08G 1/161; H04W 4/44
See application file for complete search history.

(56) References Cited

U.S. PATENT DOCUMENTS 6,801,850 B1 * 10/2004 Wolfson ............ G01C 21/3415 701/410
2016/0049079 A1 * 2/2016 Ibrahim ................ G08G 1/164 340/944

(Continued)

FOREIGN PATENT DOCUMENTS

CN 1488955 A 4/2004
CN 1595191 A 3/2005

(Continued)

OTHER PUBLICATIONS

Examination Report dated Aug. 6, 2020 in corresponding German application No. 10 2019 127 930.5; 10 pages Including Machine-generated English-language translation.

(Continued)

*Primary Examiner* — Aniss Chad
*Assistant Examiner* — Stephanie T Su
(74) *Attorney, Agent, or Firm* — Maier & Maier, PLLC

(57) ABSTRACT

A method for determining the position of a non-motorized road user including ascertaining a first geodetic position of the road user in a position determination device, which uses a global navigation satellite system, of the terminal, and transmitting the first geodetic position to a traffic device. In a control unit of the traffic device, ascertaining a second geodetic position of the road user from a geodetic traffic device position and a relative position ascertained from sensor data, showing the road user, of at least one surroundings sensor of the traffic device. At least if a limiting value for a deviation of the first position from the second position is exceeded, transmitting an item of deviation information describing the second position and/or the deviation from the traffic device to the mobile terminal, and using the deviation information to correct the position ascertainment in the position determination device.

11 Claims, 2 Drawing Sheets

(56) References Cited

U.S. PATENT DOCUMENTS

| | | | | |
|---|---|---|---|---|
| 2018/0068562 | A1 | 3/2018 | Ho et al. | |
| 2019/0138007 | A1* | 5/2019 | Baghsorkhi | B60W 30/08 |
| 2019/0333379 | A1* | 10/2019 | Malkes | G08G 1/04 |
| 2020/0357284 | A1* | 11/2020 | Sutou | G08G 1/096791 |
| 2020/0372285 | A1* | 11/2020 | Adams | G06N 3/084 |

FOREIGN PATENT DOCUMENTS

| | | | |
|---|---|---|---|
| CN | 104584101 | A | 4/2015 |
| CN | 106574976 | A | 4/2017 |
| DE | 10 2009 045 709 | A1 | 9/2010 |
| DE | 102010018900 | A1 | 11/2011 |
| DE | 10 2011 111 899 | A1 | 2/2013 |
| DE | 102012221004 | A1 | 5/2014 |
| DE | 10 2014 219 665 | A1 | 4/2015 |
| DE | 102015206342 | A1 | 10/2015 |
| DE | 10 2015 225 751 | A1 | 6/2017 |
| KR | 1020130000754 | A | 1/2013 |

OTHER PUBLICATIONS

Office Action dated Dec. 27, 2023, in corresponding Chinese Application No. 202011102707.5, 12 pages.

* cited by examiner

METHOD FOR DETERMINING THE POSITION OF A NON-MOTORIZED ROAD USER AND TRAFFIC DEVICE

FIELD

The disclosure relates to a method for determining the position of a non-motorized road user, in particular a pedestrian or cyclist, wherein the road user carries a mobile terminal, in particular a mobile telephone, which is designed for direct communication at least with a communication device of a traffic device operated in surroundings around the road user, wherein the method comprises the following steps:

ascertaining a first geodetic position of the road user in a position determination device, which uses a global navigation satellite system, of the terminal, transmitting the first geodetic position to a traffic device, in a control unit of the traffic device, ascertaining a second geodetic position of the road user from a geodetic traffic device position and a relative position ascertained from sensor data showing the road user of at least one surroundings sensor of the traffic device. The disclosure also relates to a traffic device.

BACKGROUND

Non-motorized road users, especially comprising pedestrians and cyclists, are often particularly at risk in road traffic and are therefore also referred to as "Vulnerable Road Users" (VRU). Any contact with other road users carries a particularly high risk of injury for them. VRUs of this type therefore play an important role for predictive safety functions of safety systems, for example in motor vehicles, in particular with regard to function triggering and/or position accuracy. Such safety functions, which are implemented in motor vehicles in particular, are presently primarily or even exclusively based on the surroundings sensors of the motor vehicle as a traffic device, wherein moreover it has been proposed that the position of the non-motorized road user be determined by way of mobile terminals carried by the non-motorized road users, for example, smart phones, smart watches, bicycles, and the like, for example, via a position determination device that uses a global navigation satellite system (GNSS). For example, such a position determination device can have a GPS receiver. The position thus ascertained can be provided via communication messages to other road users and/or stationary traffic devices, in particular infrastructure devices.

However, the problem arises in this case that the ego position ascertainment via the mobile terminals of the VRUs does not have sufficient accuracy which is required for safety functions that are based on such a communication of the mobile terminals. Such communication is also known as "Car2Pedestrian" (C2P, relates to pedestrians and cyclists). A GPS position determination can have inaccuracies of a few meters, for example, which makes it difficult for safety functions of a motor vehicle, for example, to brake for pedestrians or the like on the basis of this information. This is problematic in particular if the person or the non-motorized road user in general cannot be detected by the surroundings sensors of the motor vehicle and the first geodetic position of the pedestrian obtained via the communication message thus provides the only indication of their whereabouts.

DE 10 2011 111 899 A1 relates to a detection device and a method for detecting a carrier of a transceiver in a motor vehicle. In this case, the motor vehicle has a transceiver which is designed to communicate with a mobile transceiver to be detected, and a surroundings sensor device for acquiring items of information about the surroundings of the vehicle. An evaluation device is designed to ascertain a carrier type of the mobile transceiver and an imminent collision of the carrier of the transceiver with the vehicle in dependence on the communication and the acquired items of information. A control unit can activate a warning signal device and/or a vehicle device of the vehicle in dependence on the ascertained carrier type in such a way that a collision is prevented or its consequences are reduced. Items of information of the mobile transceiver and from the surroundings sensor device are combined to ascertain the carrier type.

DE 10 2015 225 751 A1 relates to a method for predicting a movement of a road user in a traffic area, wherein an item of position information and/or a movement vector of the road user in the traffic area is read in, an estimated destination of the movement is ascertained on the basis of a stored movement history of the road user, and a movement profile is compiled to predict the movement of the road user in the traffic area. For example, items of information stored in a smart phone or another suitable mobile device of the road user, such as frequently visited locations, time of day, day, calendar entries, etc. can be accessed for the formation of the destination estimation information. The vehicle can also have a surroundings sensor to record the movement of the pedestrian and to generate a collision warning in the vehicle.

DE 10 2014 219 665 A1 relates to a device for controlling/regulating the operation of a vehicle which can communicate with a moving object through a portable terminal carried by the moving object. This comprises a receiving unit, which can receive a movement plan of the moving object to be transmitted by the portable terminal, and a timetable preparation unit, which is designed to prepare a timetable of the vehicle based on the received movement plan of the moving object. The driver can be informed about the prepared timetable via an information unit. The motor vehicle can have a radar device that can detect a pedestrian or another obstacle, for example.

SUMMARY

The disclosure is based on the object of specifying a possibility for improving the determination of the ego position of a non-motorized road user, in particular a VRU.

To achieve this object, furthermore the following steps are provided according to the disclosure in a method of the type mentioned at the outset:

at least if a limiting value for a deviation of the first position from the second position is exceeded, transmitting an item of deviation information describing the second position and/or the deviation from the traffic device to the mobile terminal, and using the deviation information to correct the position ascertainment in the position determination device.

The disclosure thus proposes, in the cases in which a traffic device, in particular a stationary infrastructure device (road side unit—RSU) or a motor vehicle, can detect the road user using a separate surroundings sensor system and carry out a separate position determination, giving the position determination device of the mobile terminal a type of "feedback" by using the bidirectionality of the communication link, which the position determination device can use to thereupon determine a significantly more accurate first position and transmit it to further road users, in particular motor vehicles having safety functions. This accuracy increase proves to be advantageous in particular in those cases in which a motor vehicle or another road user having a safety function cannot comprise the non-motorized road user using its own surroundings sensor system, but this is nonetheless relevant due to the transmitted first information. This is the case, for example, if the road user, for example a pedestrian, is traveling between two parked motor vehicles or is concealed in another way, for example, by a corner of a house. If the accuracy of the first position is significantly increased, it is possible to reasonably brake for and/or indicate the non-motorized road user. This would not be possible or would only be possible with difficulty with a high degree of inaccuracy of the first position. However, since many traffic situations occur in which the non-motorized road user is detected by surroundings sensors of other traffic devices, in particular of motor vehicles and/or stationary infrastructure devices, many possibilities result for checking the first position and improving it, so that in particular the accuracy of the first position can approach the accuracy of the second position. In this case, the feedback is preferably transmitted in any case, that is to say even if the deviation is extremely small, since there is then a possibility of checking the first position in the position determination device The present disclosure makes use of the fact that the expanded possibilities of traffic facilities, in particular motor vehicles, with regard to determining the position of road users, lead to improved accuracy of the second position. A stationary infrastructure device (RSU), which can be a traffic monitoring device, an intelligent traffic signal, or the like, for example, knows its own geodetic position extremely accurately due to its fixed location and can be equipped with sufficiently accurate evaluation electronics to evaluate sensor data of the at least one surroundings sensor and to permit a high-accuracy determination of the position of the non-motorized road user which would not be possible using its position determination device alone, even if odometry and/or map matching are additionally used. Similarly, a variety of mechanisms exist in modern motor vehicles which permit the ego geodetic position to be determined with high accuracy and moreover enable outstanding evaluation of sensor data of the at least one surroundings sensor, so that the second position can have a significantly higher accuracy than the (uncorrected) first position. Mechanisms to enable the ego position of motor vehicles to be determined with high accuracy, in particular also using sensor data of the at least one surroundings sensor, have already been proposed in various ways in the prior art and can also be implemented in the scope of the present disclosure. The ego position determination of the motor vehicle, which is carried out, for example, by a corresponding control unit, can also be based on a sensor of a global navigation satellite system (GNSS system), in particular a GPS sensor.

In summary, it is thus proposed that the position determination accuracy of VRUs be improved by a type of "feedback information" of traffic devices, so that particularly advantageously, due to the higher position determination accuracy, items of information, in particular the first position, from communication messages of mobile terminals of non-motorized road users, in particular pedestrians or cyclists, can be used to trigger active, networked vehicle safety functions.

Specifically, it can be provided that the first geodetic position is transmitted in the scope of a status message, which is in particular emitted cyclically, to the traffic device and/or is used for communication of the mobile terminal with the traffic device of a WLAN connection and/or mobile wireless direct connection. Such status messages have already been proposed as communication messages, in particular in the context of C2P communication. For example, the status message can be a so-called "Cooperative Awareness Message" (CAM) and/or a "Basic Safety Message" (BSM). In addition to the already frequently proposed WLAN communication links, it is furthermore possible within the scope of the present disclosure to use the newly proposed, advantageous mobile wireless direct connections as a communication link. These possibilities for direct communication of traffic devices and/or road users via a mobile wireless network, which are known, for example, in the 5G standard, are also referred to collectively as C-V2X (Cellular Vehicle-to-Everything).

A camera and/or a radar sensor and/or a lidar sensor and/or an ultrasonic sensor can be used as a surroundings sensor in the traffic device. The perception of the surroundings provided in this way makes it possible, in particular in the context of a sensor data fusion, to detect objects, in particular also non-motorized road users, outside the traffic device and also to determine the relative position from which the second position of the road user can be ascertained together with a geodetic traffic device position.

One design of the present disclosure can also provide that the first position is considered in the ascertainment of the second position, in particular in the context of an assignment of the transmitter of the first position to an object detected in the sensor data. In order to ascertain the second position deliberately for the non-motorized road user (as the transmitter of the communication message, in particular a status message) and be able to compare it to the first position, an assignment of at least one object detected in the sensor data of the at least one surroundings sensor to the road user as the transmitter of the first position has to be possible. The first position itself can be used here, for example, if there are no other (possible) objects within a distance around it given by the radius of the uncertainty of the first position. A corresponding uncertainty value can be transmitted with the first position as part of the communication message, in particular a status message. While, for example, as long as no second position has been used for correction, the uncertainty value can still be assumed to be quite high, but traffic situations will still often exist in which a clear assignment is still possible, an "initial correction" is therefore often already possible on this basis, according to which the uncertain value will typically sink, which can possibly also be dependent on a further uncertainty value associated with the second position and transmitted with it.

It is furthermore conceivable in the scope of the present disclosure that for an assignment of the transmitter of the first position to an object detected in the sensor data, a movement history of the road user transmitted in particular with the first position is compared to a movement history of the object ascertained from the sensor data and/or a recognition feature, which is transmitted with the first position and is detectable by at least one of the at least one surroundings sensor, is established on the object. Therefore, other possibilities already fundamentally known in the prior art are also conceivable for enabling an assignment of object and transmitter as the foundation of the determination of the second position. Thus, for example, movement paths can be compared as they can be derived from successively received first positions and/or part of a status message and also from sensor data of the surroundings sensor. Furthermore, of course, recognition features of the road user and/or the mobile terminal detectable in sensor data of the surroundings sensor can also be used to enable the assignment. Concepts having individual markers, which are distinguishable in particular, and the like have also already been proposed in the prior art.

The deviation information can particularly advantageously be used to recalibrate the position determination system and/or a corrected position of the road user can be ascertained from the first position and the second position, in particular by a weighted combination. For example, it is specifically possible to consider the second position to be the "correct" geodetic position of the mobile terminal and thus of the non-motorized road user, to which, for example, position changes ascertained by a GPS receiver and/or odometry are applied. However, it is also conceivable, for example depending on the existing uncertainty values, to perform a weighted combination of the first position with the second position in order to determine a correction of the current geodetic position. However, in particular if first positions and/or deviations are repeatedly obtained from a specific traffic device or in a specific traffic situation, it can also be conceivable to infer an at least local systematic error by evaluation in the position determination device and to derive a corresponding correction to be applied at least locally or temporarily. Obviously, greatly varying approaches, which are also applicable in combination, are conceivable to achieve an improvement of the position determination on the part of the mobile terminal and thus the non-motorized road user. As already mentioned, the traffic device can be a stationary infrastructure device or a motor vehicle. The motor vehicle can have a safety system which is designed to use the first position even when the second position is not present, in particular to evade and/or brake for the road user. This means that due to the improvement of the quality of the first position by "feedback", in particular also from multiple road users, the quality of the first position is increased in such a way that even if the corresponding road user is not detectable by the surroundings sensor of the motor vehicle, it can be used to trigger at least one measure of the safety system, in particular a driving intervention such as an evasive maneuver and/or braking for the road user. In this way, the safety of VRUs in road traffic is significantly increased.

The disclosure furthermore relates to a traffic device, having a communication device, at least one surroundings sensor, and a control unit, wherein the control unit has:

an ascertainment unit for ascertaining a second geodetic position of a road user from a geodetic traffic device position and a relative position ascertained from sensor data showing the road user from at least one surrounding sensor of the traffic device with first geodetic position of the road user received via the communication device, and a deviation unit for determining an item of deviation information describing the second position and/or a deviation of the first position from the second position and for controlling the communication device to emit the deviation information to the road user at least if a limiting value is exceeded by the deviation.

All statements relating to the method according to the disclosure may be transferred similarly to the traffic device according to the disclosure, with which the advantages already mentioned can therefore also be obtained. The traffic device can specifically be designed as a motor vehicle or a stationary infrastructure device.

The traffic device is thus designed to send "feedback" in the form of the deviation information to mobile terminals of non-motorized road users who announce their first position via a communication message, in particular a status message, in particular cyclically.

A communication system is also conceivable in the scope of the present disclosure, having at least one traffic device according to the disclosure and at least one mobile terminal of a non-motorized road user, which is designed to carry out the method according to the disclosure.

BRIEF DESCRIPTION OF THE FIGURES

Further advantages and details of the present disclosure will be apparent from the exemplary embodiments described below and in reference to the drawings. In the figures.

DETAILED DESCRIPTION

Figure 1:
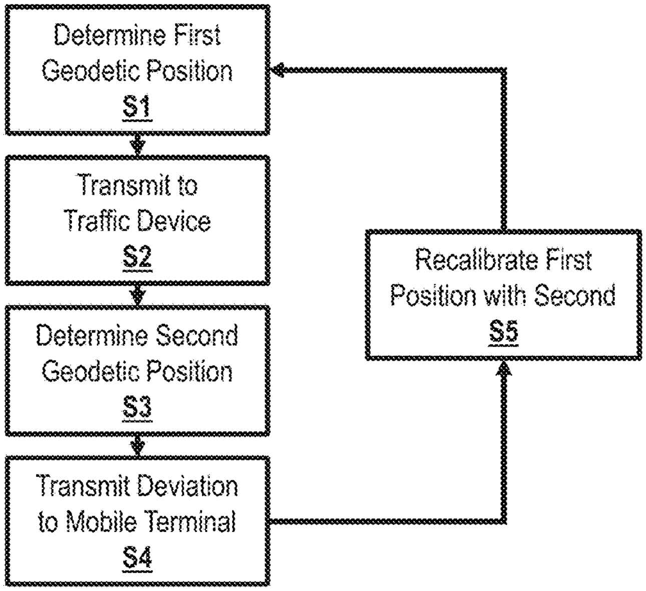
FIG. 1 shows a flow chart of an exemplary embodiment of the method according to the disclosure

FIG. 1 shows a flow chart of an exemplary embodiment of the method according to the disclosure. In the present case, a traffic situation is considered in which a non-motorized road user who carries a mobile, in particular hand-held mobile device, for example a smartphone, is traveling in such a way that he is detected by at least one surroundings sensor of a traffic device, which can be a motor vehicle or a stationary infrastructure device. Even if a pedestrian is primarily described as a non-motorized road user, this is not intended to represent a restriction, since the method can advantageously be applied to all types of so-called "Vulnerable Road Users" (VRUs), also including cyclists, for example.

The mobile terminal has a position determination device, which in the present case includes, for example, a GPS receiver in order to determine a first geodetic position of the mobile terminal and thus also of the non-motorized road user, which takes place in a step S1. In particular, if no items of "feedback" information have yet been used by traffic devices, this first geodetic position should be evaluated as not particularly accurate, it thus has a very high uncertainty value, for example, in the range of multiple meters. Nevertheless, this first geodetic position of the non-motorized road user is emitted in a step S2 in the context of a cyclically transmitted status message, for example a CAM and/or a BSM, to other road users or traffic devices that receive this status message via a corresponding communication link with the mobile terminal, which can be a WLAN connection or a mobile wireless direct connection, by means of a corresponding communication device. Receiving traffic devices, in the present case a motor vehicle by way of example, always attempt when a first position is received which is transmitted in the present case jointly with the mentioned uncertainty value, to ascertain a second geodetic position for the non-motorized road user in a step S3 on the basis of sensor data of at least one ego surroundings sensor, typically multiple surroundings sensors. If the road user is in the detection range of one or more surroundings sensors of the motor vehicle or the traffic device in general, wherein these surroundings sensors can be, for example, radar sensors, cameras, lidar sensors, ultrasonic sensors, and the like, the high quality of current sensor data and evaluation algorithms, which use sensor fusion in particular, permit a high-accuracy relative position of the non-motorized road user to be ascertained in relation to the ego vehicle (or the traffic device in general). At the same time, however, there is also a possibility in the motor vehicle of determining a geodetic traffic device position which can use, for example, a GPS sensor intrinsic to the motor vehicle jointly with odometry, map matching, dGPS, and/or sensor data of the at least one surroundings sensor to carry out a significantly more accurate geodetic position determination. A second geodetic position of the non-motorized road user can therefore be ascertained from the traffic device position and the relative position. This second position is then significantly more accurate than the first position (still assumed to be determined without feedback).

It should be noted that in step S3, of course, a suitable assignment of the non-motorized road user as the transmitter of the first position to an object detected within the sensor data of the at least one surroundings sensor also takes place. This can be possible, if necessary also alone, on the basis of the first position itself, for example if there are no other candidate objects located around the first position within the uncertainty range described by the uncertainty value. However, other assignment techniques are also possible, for example those that use the movement history and/or those that use the recognition features.

In a step S4, the second geodetic position and/or the deviation between the first geodetic position and the second geodetic position is transmitted as deviation information by means of the communication device via the communication link to the mobile terminal of the non-motorized road user. This does not have to take place in every case in all exemplary embodiments, but rather can also be carried out restricted to cases in which the deviation is greater than the limiting value. However, this is less preferred.

In a step S5, the feedback received in the form of the second position, with which an uncertainty value can also be transmitted, is evaluated and used to improve the position determination within the mobile terminal. The second position, if it is sufficiently accurate, can be used, for example, for a recalibration, in particular as the position currently assumed to be correct, and/or a corrected new first position can be ascertained by weighted combination of the first and the second position, for example, using the uncertainty values as or for determining the weights. If multiple second positions are received from traffic devices, in particular within a certain period and/or within a certain traffic environment, they can be evaluated to determine an at least locally existing systematic error and to accordingly adapt the ascertainment of the first position in the position determination device at least locally in such a way that the at least locally existing systematic error is avoided.

Figure 2:
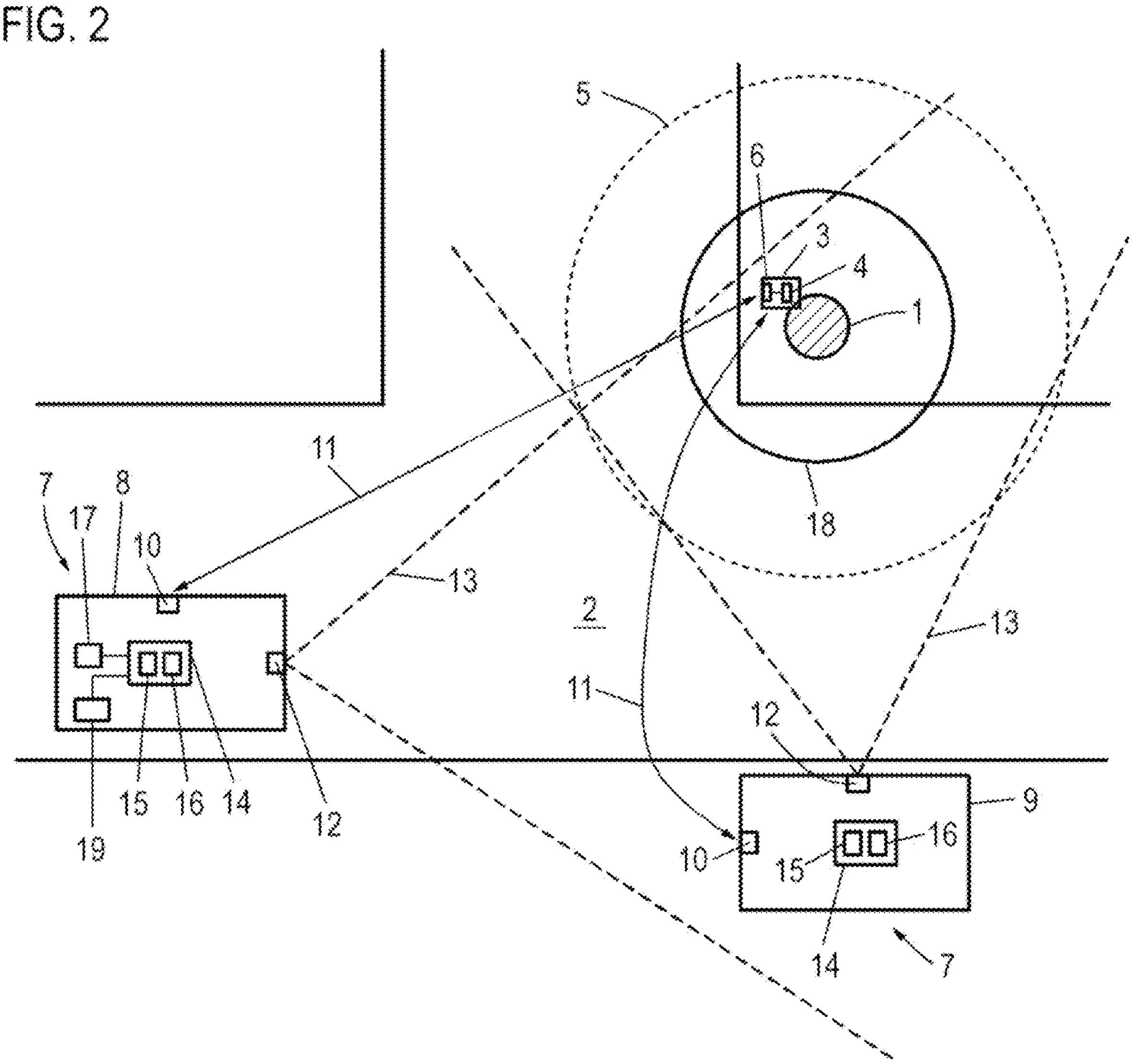
FIG. 2 shows a first traffic situation to explain the present disclosure.

FIG. 2 shows a traffic situation, on the basis of which the method according to the disclosure can be clearly explained. A non-motorized road user 1 is shown, here a pedestrian who is moving on a sidewalk in the region of a T-intersection 2. The road user 1 carries a mobile terminal 3, here, for example, a smartphone. The mobile terminal 3 has a GNSS-based position determination device 4, wherein the uncertainty in the position determination inherent in the position determination device 4 is indicated by the dashed circle 5. The mobile terminal 3 in the present case furthermore has a transceiver unit 6, via which a communication with other road users or traffic devices is possible, for example in this exemplary embodiment via CV2X, therefore a mobile wireless direct connection. A WLAN connection is also conceivable.

In the surroundings of the road user 1 there are presently two traffic devices 7 according to the disclosure by way of example, namely on the one hand a motor vehicle 8, on the other hand a stationary infrastructure device 9, for example a traffic monitoring device and/or a traffic signal. Both traffic devices 7 have a communication device 10, via which a communication link 11 can be established with the mobile terminal 3, via which status messages from the mobile terminal 3 having the first position (and possibly an uncertainty value) can be received, but also items of deviation information can be transmitted back to the mobile terminal 3. In order to be able to determine second positions, the traffic devices 7 each have surroundings sensors 12, wherein one of these surroundings sensors 12 is shown as an example and representative in the present case, in the respective detection range 13 of which the road user 1 is located. Both of the traffic devices 7 illustrated by way of example furthermore have a control unit 14, in the case of the motor vehicle 8 in particular a control device. The control unit 14 in turn comprises an ascertainment unit 15 for ascertaining the second geodetic position and a deviation unit 16 for ascertaining and transmitting the deviation information. In the case of the motor vehicle 8, the control device 14 can communicate with a GPS sensor 17 there and with other data sources, for example an inertial platform, in order to determine the most accurate geodetic traffic device position possible. In the case of the infrastructure device 9, the geodetic traffic device position is already known due to the stationary nature.

The “feedback” provided by means of the method according to the disclosure can improve the position determination within the position determination device 4 of the mobile terminal 3 in such a way that the uncertainty is significantly reduced, as indicated by the circle 18.

Figure 3:
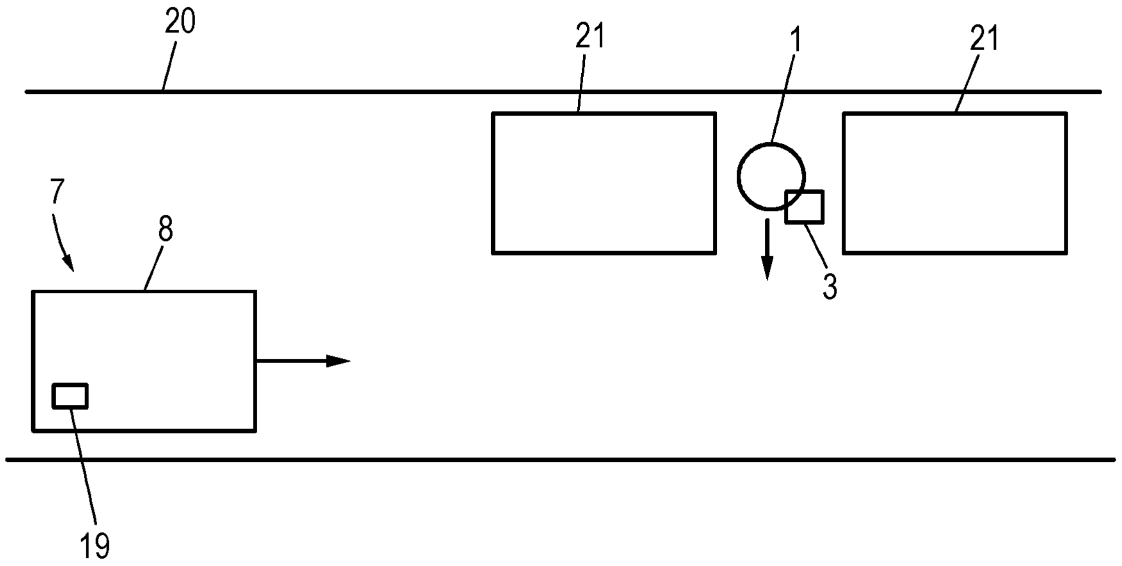
FIG. 3 shows a second traffic situation to explain the present disclosure.

In the present exemplary embodiment, the motor vehicle also has a safety system 19, which uses the particularly improved first position, which is received via the status message, to trigger measures even if the road user 1 is not detectable by means of the at least one surroundings sensor 12. An example of this is shown schematically in FIG. 3. The motor vehicle 8 travels there along a road 20, on which two motor vehicles 21 are parked. The road user 1 is located between these motor vehicles 21 and is therefore not visible to the surroundings sensor system of the motor vehicle 8. However, the first position, which was already improved in terms of its position determination and was obtained via the communication link 11, is used within the safety system 19 so that the motor vehicle 8 can in particular brake for the person 1 or evade them, although it cannot detect them.

The invention claimed is:

1. A method for determining a position of a non-motorized road user carrying a mobile terminal, the method comprising:

ascertaining a first geodetic position of the non-motorized road user using a GPS system of the mobile terminal of the non-motorized road user, transmitting the first geodetic position to a traffic device, the traffic device comprising at least one of a stationary infrastructure device, a roadside unit, and a motor vehicle, using at least one sensor of the traffic device to ascertain a second geodetic position of the non-motorized road user relative to a position of the traffic device, transmitting deviation information from the traffic device to the mobile terminal, the deviation information comprising at least one of (1) the second geodetic position and (2) a deviation between the first geodetic position and the second geodetic position, correcting, at the mobile terminal, the first geodetic position using the deviation information, such that the corrected first geodetic position is based on a weighted combination of the first geodetic position and the deviation information, and transmitting, in subsequent cycles, the corrected first geodetic position to the traffic device or other nearby motor vehicles.

2. The method as claimed in claim 1, wherein transmission of the first geodetic position or the corrected first geodetic position is conducted cyclically.

3. The method as claimed in claim 1, wherein the at least one sensor of the traffic device comprises at least one of a camera, a radar sensor, a lidar sensor, and an ultrasonic sensor.

4. The method as claimed in claim 1, further comprising assigning, by the traffic device, the first geodetic position to the second geodetic position.

5. The method as claimed in claim 4, wherein a movement history of the non-motorized road user transmitted with the first geodetic position is compared with a movement history recorded by the traffic device to assign the first geodetic position to the second geodetic position.

6. The method as claimed in claim 1, further comprising correcting local systematic error of the traffic device based on deviation information received from a plurality of traffic devices.

7. The method as claimed in claim 1, wherein a safety system of the motor vehicle is configured to act upon the first geodetic position in absence of the corrected first geodetic position.

8. The method as claimed in claim 1, wherein the deviation information further comprises an uncertainty value.

9. The method as claimed in claim 1, wherein the mobile terminal receives a plurality of deviation information from a plurality of traffic devices and the corrected first geodetic position is based on a weighted combination of the first geodetic position and the plurality of deviation information.

10. The method as claimed in claim 1, wherein transmission of the deviation information to the mobile terminal depends on a comparison between the deviation information and a threshold value.

11. A traffic device comprising at least one of a stationary infrastructure device, a roadside unit, and a motor vehicle and which is configured to:

receive a first geodetic position of a non-motorized road user carrying a mobile terminal, the first geodetic position ascertained by a GPS system of the mobile terminal of the non-motorized road user, ascertain a second geodetic position of the non-motorized road user relative to a position of the traffic device using at least one sensor of the traffic device, transmit deviation information from the traffic device to the mobile terminal, the deviation information comprising at least one of (1) the second geodetic position and (2) a deviation between the first geodetic position and the second geodetic position, and receive, from the mobile terminal in subsequent cycles, a corrected first geodetic position in which the first geodetic position has been corrected at the mobile terminal using the deviation information such that the corrected first geodetic position is based on a weighted combination of the first geodetic position and the deviation information.

* * * * *